(12) United States Patent
Sitka et al.

(10) Patent No.: US 10,465,481 B2
(45) Date of Patent: Nov. 5, 2019

(54) ELECTRICAL CONVEYANCE FOR DOWNHOLE TOOLS

(71) Applicants: Halliburton Energy Services, Inc., Houston, TX (US); Chevron U.S.A. Inc., San Ramon, CA (US)

(72) Inventors: Mark A. Sitka, Richmond, TX (US); Mukul M. Agnihotri, Spring, TX (US)

(73) Assignees: Halliburton Energy Services, Inc., Houston, TX (US); Chevron U.S.A. Inc., San Ramon, CA (US)

( * ) Notice: Subject to any disclaimer, the term of this patent is extended or adjusted under 35 U.S.C. 154(b) by 192 days.

(21) Appl. No.: 15/511,537

(22) PCT Filed: Feb. 8, 2016

(86) PCT No.: PCT/US2016/016997
§ 371 (c)(1),
(2) Date: Mar. 15, 2017

(87) PCT Pub. No.: WO2017/138914
PCT Pub. Date: Aug. 17, 2017

(65) Prior Publication Data
US 2018/0142535 A1    May 24, 2018

(51) Int. Cl.
*E21B 7/15* (2006.01)
*E21B 41/00* (2006.01)
(Continued)

(52) U.S. Cl.
CPC ............. *E21B 41/00* (2013.01); *E21B 7/15* (2013.01); *E21B 17/003* (2013.01);
(Continued)

(58) Field of Classification Search
CPC .......... E21B 41/00; E21B 7/15; E21B 17/003; E21B 17/028; E21B 10/00; E21B 3/02; F16C 19/364; F16C 2352/00
See application file for complete search history.

(56) References Cited

U.S. PATENT DOCUMENTS

| 5,803,191 A | 9/1998 | Mackintosh |
| 6,103,031 A | 8/2000 | Aeschbacher et al. |

(Continued)

FOREIGN PATENT DOCUMENTS

| EP | 2554779 | 2/2013 |
| WO | 2015/171334 | 11/2015 |

OTHER PUBLICATIONS

International Search Report and Written Opinion, Application No. PCT/US2016/016997; 16 pgs., dated Oct. 31, 2016.
(Continued)

*Primary Examiner* — Brad Harcourt
(74) *Attorney, Agent, or Firm* — Baker Botts L.L.P.

(57) ABSTRACT

A electrical conveyance for downhole tools is disclosed. The electrical conveyance system may include an electrical power manifold, a drill string coupled to the electrical power manifold, a multi-conductor conduit extending through an interior of the drill string, and a stinger assembly extending from an exterior of the electrical power manifold to an interior of the electrical power manifold to couple the multi-conductor conduit to an electrical power source.

24 Claims, 11 Drawing Sheets

(51) Int. Cl.
    *E21B 17/00*     (2006.01)
    *E21B 17/02*     (2006.01)
    *E21B 10/00*     (2006.01)
    *F16C 19/36*     (2006.01)
    *E21B 3/02*     (2006.01)

(52) U.S. Cl.
    CPC .............. *E21B 17/028* (2013.01); *E21B 3/02* (2013.01); *E21B 10/00* (2013.01); *F16C 19/364* (2013.01); *F16C 2352/00* (2013.01)

(56) References Cited

U.S. PATENT DOCUMENTS

| | | |
|---|---|---|
| 8,616,302 B2 | 12/2013 | Moeny |
| 2005/0161231 A1* | 7/2005 | Prendin .................... E21B 23/14 |
| | | 166/385 |
| 2010/0243325 A1 | 9/2010 | Veeningen |
| 2012/0168177 A1* | 7/2012 | Moeny ....................... E21B 7/15 |
| | | 166/380 |

OTHER PUBLICATIONS

Traynor, Jr., B.V. et al., "Electrodril System Field Test Program, Phase I—Final Report," General Electric Company, Space Division, Oct. 1977.

Traynor, Jr., B.V. et al., "Electrodril System Field Test Program, Phase II—Deep Drilling System Demonstration, Final Report Phase II, Task B," General Electric Company, Space Division, Apr. 1979.

* cited by examiner

ELECTRICAL CONVEYANCE FOR DOWNHOLE TOOLS

RELATED APPLICATIONS

This application is a U.S. National Stage Application of International Application No. PCT/US2016/016997 filed Feb. 8, 2016, which designates the United States, and which is incorporated herein by reference in its entirety.

TECHNICAL FIELD

The present disclosure relates generally to downhole electrical tools and, more particularly, to an electrical conveyance suitable for providing power to downhole electrical tools.

BACKGROUND

Electrocrushing drilling uses pulsed power technology to drill a borehole in a rock formation. Pulsed power technology repeatedly applies a high electric potential across the electrodes of an electrocrushing drill bit, which ultimately causes the surrounding rock to fracture. The fractured rock is carried away from the bit by drilling fluid and the bit advances downhole.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

The present disclosure relates to downhole electrical tools and, in particular, to a method of conveying power to a downhole electrical tool. A drill string includes a multi-conductor conduit that extends through the interior of the drill string. The conduit contains at least one electrical conductor and is coupled to the downhole electrical tool and to a stinger assembly located in an electrical power manifold on a derrick at the surface such that the conduit transmits power from the surface to the downhole electrical tool. The stinger assembly can be disconnected from the conduit while the drill string is rotating and connected to the conduit when the drill string is not rotating. The stinger assembly may be coupled to an electrical generator at the surface via a switch. The switch may allow the electrical generator to provide power to a top drive on the derrick during subterranean operations when the downhole electrical tool is not in use and provide power to the stinger assembly in the electrical power manifold when the downhole electrical tool is in use. The switch may include power conditioning circuits to render power usable by both the top drive and the downhole electrical tool. The switch and the electrical power manifold allow the use of existing drilling system hardware during operation of downhole electrical tools and increase the efficiency in reconfiguring a derrick when switching between downhole rotary tools and downhole electrical tools. As compared to prior methods, those of the present disclosure may reduce the time and costs associated with using downhole electrical tools.

There are numerous ways in which an electrical power manifold and multi-conductor conduit may be implemented in a system for powering a downhole electrical tool. Thus, embodiments of the present disclosure and its advantages are best understood by referring to FIGS. 1 through 11, where like numbers are used to indicate like and corresponding parts.

Figure 1:
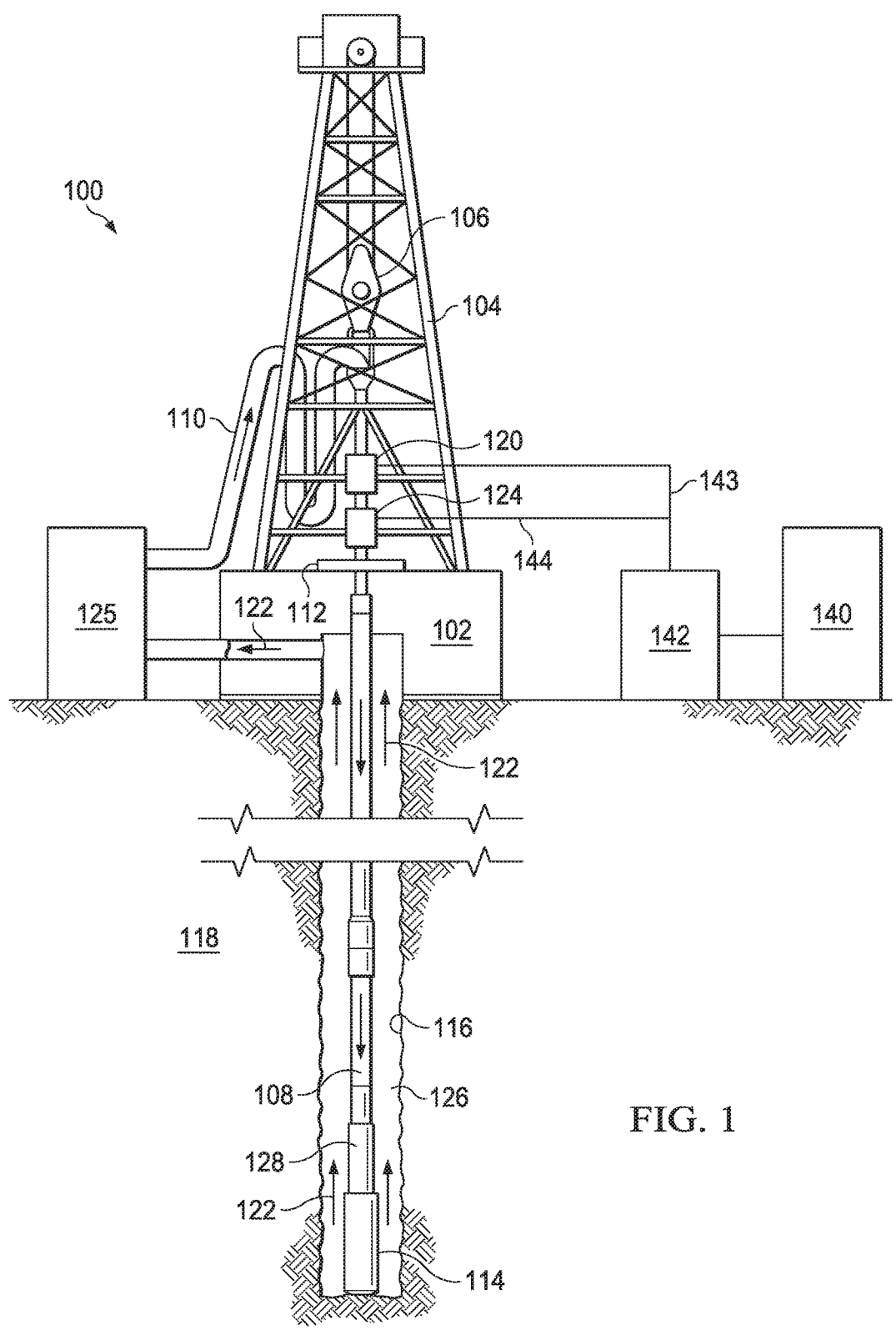
FIG. 1 is an elevation view of an exemplary downhole electrocrushing drilling system used in a wellbore environment.

FIG. 1 is an elevation view of an exemplary electrocrushing drilling system used to form a wellbore in a subterranean formation. Although FIG. 1 shows land-based equipment, downhole tools incorporating teachings of the present disclosure may be satisfactorily used with equipment located on offshore platforms, drill ships, semi-submersibles, and drilling barges (not expressly shown). Additionally, while wellbore 116 is shown as being a generally vertical wellbore, wellbore 116 may be any orientation including generally horizontal, multilateral, or directional.

Drilling system 100 includes drilling platform 102 that supports derrick 104 having traveling block 106 for raising and lowering drill string 108. Drilling system 100 also includes pump 125, which circulates electrocrushing drilling fluid 122 through a feed pipe to kelly 110, which in turn conveys electrocrushing drilling fluid 122 downhole through interior channels of drill string 108 and through one or more orifices in electrocrushing drill bit 114. Electrocrushing drilling fluid 122 then circulates back to the surface via annulus 126 formed between drill string 108 and the sidewalls of wellbore 116. Typically, during use of drilling system 100, electrocrushing drilling fluid 122 carries fractured formation formed by electrocrushing drill bit 114 back to the surface with it.

Derrick 104 may also include top drive 124 that rotates drill string 108 during a rotary drilling operation. During a rotary drilling operation, a rotary drill bit (not expressly shown) may be coupled to drill string 108. Top drive 124 may receive power from generator 140 and power-conditioning unit 142 via cable 144 such that top drive 124 rotates drill string 108 and the rotary drill bit such that the rotary drill bit forms portions of wellbore 116. The rotary drill bit may be used when drilling through softer formations. When the rotary drill bit reaches a harder formation, the rotary drill bit may be replaced by electrocrushing drill bit 114.

Electrocrushing drill bit 114 is attached to the distal end of drill string 108. In some embodiments, electrocrushing drill bit 114 may be supplied power from the surface. For example, generator 140 may generate electrical power and provide that power to power-conditioning unit 142. Power-conditioning unit 142 may then transmit electrical energy downhole via surface cable 143 and a sub-surface a multi-conductor conduit (MCC) (shown in more detail in FIGS. 2 and 3). Cable 143 may couple power-conditioning unit 142 to electrical power (EP) manifold 120. In some drilling operations using electrocrushing drill bit 114, drill string 108 may not rotate and thus the top drive may not operate such that the power supplied by generator 140 and power-conditioning unit 142 may instead be transmitted to EP manifold 120. In other drilling operations using electrocrushing drill bit 114, drill string 108 may rotate and generator 140 and power-conditioning unit 142 may supply power to both top drive 124 and EP manifold 120.

EP manifold 120 may include a stinger assembly (not expressly shown) to couple cable 143 to the MCC contained within drill string 108. The MCC contains electrical conductors that transmit electrical energy from the surface downhole to drill bit 114. For example, a pulse-generating circuit (not expressly shown in FIG. 1) within bottom-hole assembly (BHA) 128 may receive the electrical energy from power-conditioning unit 142 via the MCC, and may generate high-energy pulses to drive electrocrushing drill bit 114. The MCC may be included in drill string 108 during rotary drilling operation or may be inserted into drill string 108 when the rotary drill bit is replaced by electrocrushing drill bit 114.

For example, pulsed-power technology may be utilized to repeatedly apply a high electric potential, for example up to or exceeding 150 kV, across the electrodes of electrocrushing drill bit 114. Each application of electric potential is referred to as a pulse. When the electric potential across the electrodes of electrocrushing drill bit 114 is increased enough during a pulse to generate a sufficiently high electric field, an electrical arc forms through a rock formation at the bottom of wellbore 116. The arc temporarily forms an electrical coupling between the electrodes, allowing electric current to flow through the arc inside a portion of the rock formation at the bottom of wellbore 116. The arc greatly increases the temperature and pressure of the portion of the rock formation through which the arc flows and the surrounding formation and materials. The temperature and pressure is sufficiently high to break the rock itself into small bits or cuttings.

The surrounding rock is removed, typically by electrocrushing drilling fluid 122, which moves it away from the electrodes and uphole. The electrocrushing drilling fluid 122 may exit drill string 108 via one or more orifices (not expressly shown) in electrocrushing drill bit 114. The one or more orifices may be found inside the electrodes of electrocrushing drill bit 114 or at different locations between the electrodes. The orifices may be placed at any location on electrocrushing drill bit 114, although typically orifices will be placed on the same end of electrocrushing drill bit 114 as the electrodes. The orifices may be simple holes, nozzles, or other shaped features. The orifices and surrounding features may also be shaped to direct electrocrushing drilling fluid 122 downhole or otherwise to allow electrocrushing drilling fluid 122 to surround and remove fractured rock from wellbore 116 or to remove or prevent formation of cavitation bubbles.

As electrocrushing drill bit 114 repeatedly fractures the rock formation and electrocrushing drilling fluid 122 moves the fractured rock uphole, wellbore 116, which penetrates various subterranean rock formations 118, is created. Wellbore 116 may be any hole drilled into a subterranean formation or series of subterranean formations for the purpose of exploration or extraction of natural resources such as, for example, hydrocarbons, or for the purpose of injection of fluids such as, for example, water, wastewater, brine, or water mixed with other fluids. Additionally, wellbore 116 may be any hole drilled into a subterranean formation or series of subterranean formations for the purpose of geothermal power generation.

Top drive 124 may also be used to rotate sections of drill string 108 when the connections between sections of drill string 108 are coupled prior to a drilling operation. For example, sections of drill string 108 may be coupled together via threaded connections. When two sections of drill string 108 and coupled, top drive 124 may rotate one section to complete the threaded connection. While top drive 124 is shown below EP manifold 120 in FIG. 1, on some derricks 104, top drive 124 may be located above EP manifold 120.

Although drilling system 100 is described herein as utilizing electrocrushing drill bit 114, drilling system 100 may also utilize an electrohydraulic drill bit. An electrohydraulic drill bit may have multiple electrodes and electrode spacing configurations similar to electrocrushing drill bit 114. But, rather than generating an arc within the rock, an electrohydraulic drill bit applies a large electrical potential across two electrodes to form an arc across the drilling fluid proximate the bottom of wellbore 116. The high temperature of the arc vaporizes the portion of the fluid immediately surrounding the arc, which in turn generates a high-energy shock wave in the remaining fluid. The electrodes of electrohydraulic drill bit may be oriented such that the shock wave generated by the arc is transmitted toward the bottom of wellbore 116. When the shock wave hits and bounces off of the rock at the bottom of wellbore 116, the rock fractures. Accordingly, drilling system 100 may utilize pulsed-power technology with an electrohydraulic drill bit to drill wellbore 116 in subterranean formation 118 in a similar manner as with electrocrushing drill bit 114.

Figure 2:
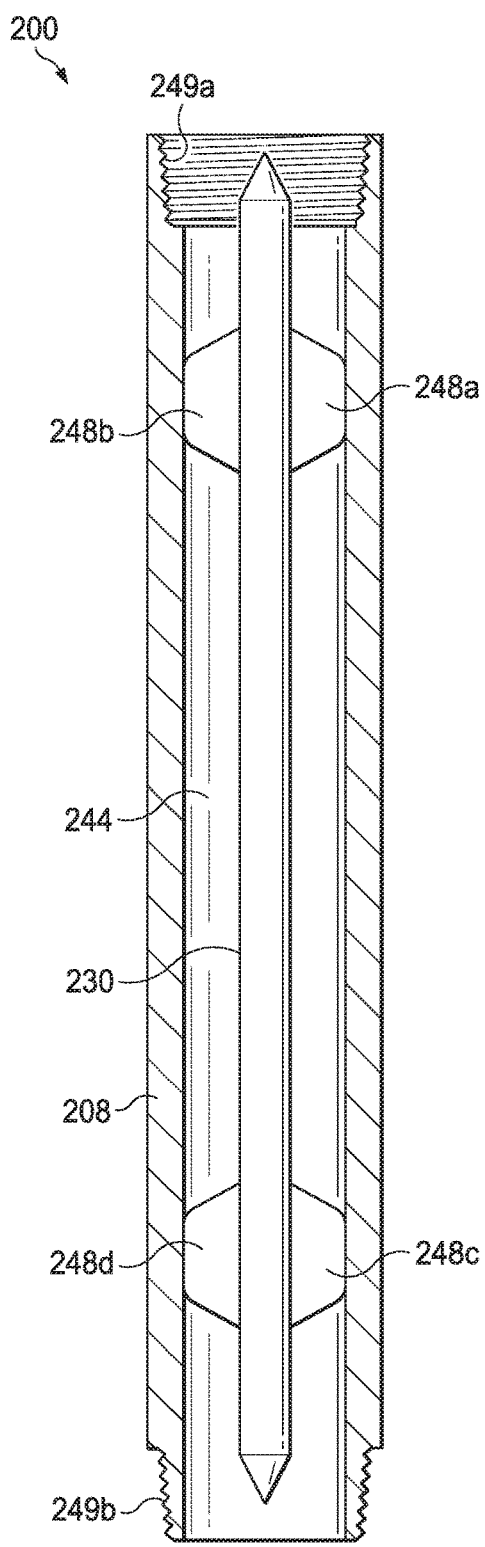
FIG. 2 is a cross-sectional view of a centralized multi-conductor conduit within a section of a drill string.

FIG. 2 is a cross-sectional view of a centralized MCC within a section of a drill string. Drill string assembly 200 includes drill string section 208 and MCC 230. Multiple sections of drill string assembly 200 may be coupled together to span the distance from a derrick at the surface to the drill bit in the wellbore. For example, multiple sections of drill string assembly 200 may form drill string 108 shown in FIG. 1. MCC 230 may extend through the center of drill string section 208 to provide a path for power to flow from the surface to a downhole electrical tool, such as electrocrushing drill bit 114 shown in FIG. 1, an electrohydraulic drill bit, downhole rotary electrical motors, downhole laser sources, logging while drilling (LWD) tools, measurement while drilling (MWD) tools, wireline tools, tubing for conveyed wireline, or any other suitable downhole electrical tool. MCC 230 may include an outer wall and internal electrical conductors, as shown in more detail in FIG. 3.

Drill string section 208 may be formed of any suitable material including steel, stainless steel, aluminum, and alloys thereof. The length of drill string section 208 may be any suitable length. For example the length of drill string section 208 may be approximately 30 to 45 feet. Drill string section 208 may include threads 249 at each end. Threads 249 may be used to couple two drill string sections 208 together. For example threads 249a on a first drill string section 208 may be rotated to couple with threads 249b on a second drill string section 208.

Annulus 244 is formed between the inner perimeter of drill string section 208 and the outer wall of MCC 230 such that drilling fluid flows through annulus 244 downhole to a downhole electrical tool. MCC 230 may be supported in drill string section 208 by centralizing fins 248a-d. Fins 248 extend from the outer body of MCC 230 to the inner perimeter of drill string section 208 to maintain the position of MCC 230 within drill string section 208 while allowing flow through annulus 244. Fins 248 may be made of a material similar to drill string section 208 including steel, stainless steel, aluminum, plastics, elastomers, and alloys and/or combinations thereof.

Figure 3:
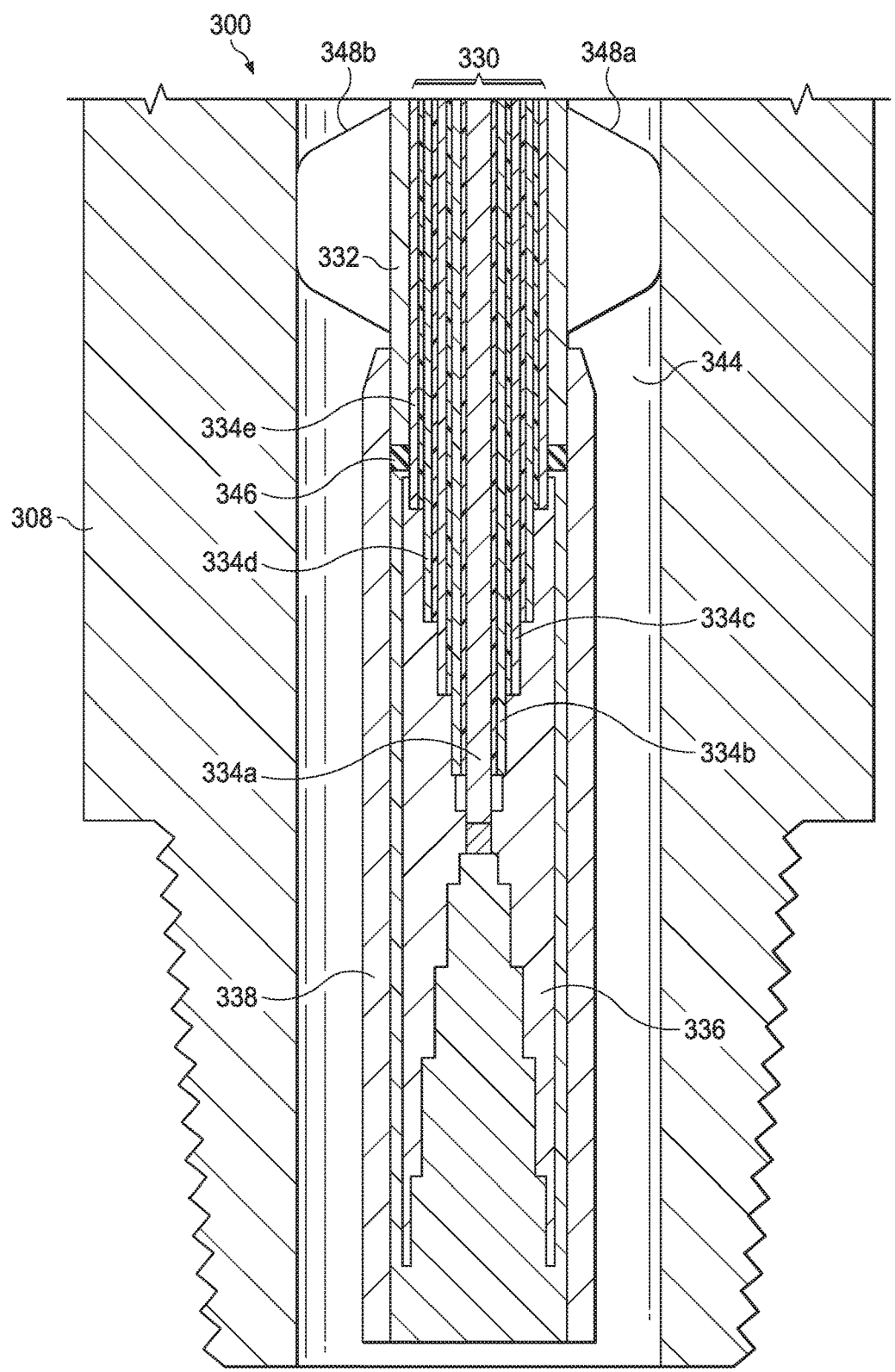
FIG. 3 is a cross-sectional view of a connection between two multi-conductor conduits within two sections of a drill string.

FIG. 3 is a cross-sectional view of a connection between two MCCs within two sections of a drill string, such as a connection between two sections of MCCs shown in FIG. 2. MCC 330 includes outer wall 332 that provides a barrier between the drilling fluid flowing through annulus 344 and conductors 334 that are located within outer wall 332. Outer wall 332 may be made of steel, stainless steel, steel alloy, aluminum, aluminum alloy, composite, or any other material suitable for the conditions within the wellbore. The thickness of outer wall 332 may be such that outer wall 332 resists deformation due to the hydrostatic pressure created by the depth and drilling fluid flowing through annulus 344 during a subterranean operation and the weight of the multiple MCCs above.

MCC 330 further includes one or more conductors 334 that transfer electrical power through MCC 330. Conductors 334 may be made of any suitable material that conducts electricity including copper or aluminum. Conductors 334 may be rigid or flexible. Conductors 334 may be arranged in any suitable configuration such as concentric cylinders of conductors 334, multiple strands of conductors 334 each surrounded by an insulator material, or a single, central conductor 334 such as a fiber optic line. In FIG. 3, conductors 334 are shown as concentric cylinders separated by an insulator material. For example, conductor 334a is a conducting cylinder surrounded by an insulator material and disposed in conductor 334b, conductor 334b is a conducting cylinder surrounded by an insulator material and disposed in conductor 334c, conductor 334c is a conducting cylinder surrounded by an insulator material and disposed in conductor 334d, and conductor 334d is a conducting cylinder surrounded by an insulator material and disposed in conductor 334e. MCC 330 may include an additional layer of insulator material to prevent direct contact between conductors 334 and outer wall 332. In some examples, MCC 330 may be arranged in a coaxial design.

Electrical contact 336 may be located at an end of a section of MCC 330 to couple two sections of MCC 330. Electrical contact 336 may be any suitable electrical connector such as a multi-point connector, for example a MULTILAM style contact designed and manufactured by Multi-Contact AG (Allschwil, Switzerland) or a BEBRO style contact designed and manufactured by Bebro Electronic Gmbh (Frickenhausen, Germany). Electrical contact 336 is electrically coupled to an electrical contact on a second section of an MCC in a second drill pipe assembly (not expressly shown). Electrical contact 336 may couple conductors 334a-334e to conductors on the second section of an MCC in the second drill pipe assembly.

MCC 330 may additionally include seal 346 that seals the internal space within outer wall 332 and prevents drilling fluid from entering the internal space within outer wall 332. Seal 346 may be any suitable seal type including an O-ring, a V-ring, or a lip seal. Seal 346 may be made of any suitable elastomeric material. The elastomeric material may be formed of compounds including, but not limited to, natural rubber, nitrile rubber, hydrogenated nitrile, urethane, polyurethane, fluorocarbon, perflurocarbon, propylene, neoprene, hydrin, etc., or a soft material including, but not limited to, bronze, brass, or metallic "C" rings.

MCC 330 may further include makeup collar 338 that surrounds the junction between two sections of MCC 330 when two sections of drill pipe assembly are coupled together. Makeup collar 338 may include threading and may be rotated at the junction of sections of MCC 330 to thread makeup collar 338 to MCC 330. Makeup collar 338 may be rotated to couple makeup collar 338 to MCC 330 at the same time drill pipe sections are threaded together. Makeup collar 338 may be made of a material similar to outer wall 332 such as steel, stainless steel, steel alloy, aluminum, aluminum alloy, or any other material suitable for the conditions within the wellbore.

Figure 4:
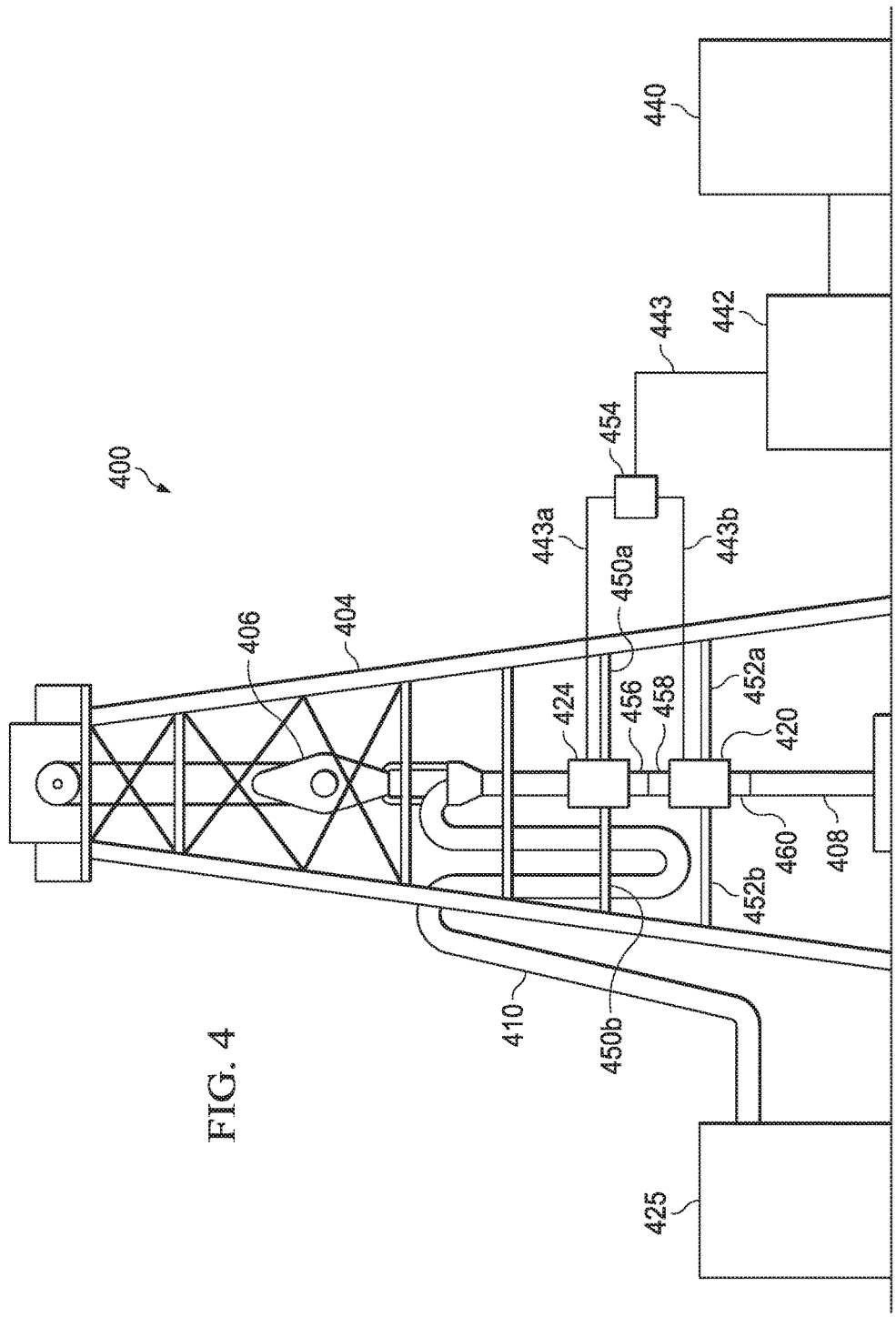
FIG. 4 is a perspective view of a derrick including an electrical power manifold located below a top drive configured to electrically connect a surface power generator to a downhole electrical tool.

MCC 330 may communicate voltage and current from the surface to a downhole electrical tool. FIG. 4 is a perspective view of a derrick including an electrical power manifold located below a top drive configured to electrically connect a surface power generator to a downhole electrical tool. Derrick 404 may include traveling block 406 coupled to top drive 424. Top drive 424 may be secured to derrick 404 by one or more strong arms 450 that prevent the housing of top drive 424 from rotating when top drive 424 rotates drill string 408. Drilling pumps 425 may pump drilling fluid into top drive 424 via kelly hose 410.

Top drive 424 may be coupled to EP manifold 420. Lower connection 456 of top drive 424 may include threads (not expressly shown) and may be torqued to threads (not expressly shown) on upper connection 458 of EP manifold 420. Top drive 424 may rotate lower connection 456 to torque the threaded coupling between lower connection 456 and upper connection 458. EP manifold 420 provides power from generator 440 and power-conditioning unit 442 to a downhole electrical tool by using a stinger assembly to couple cable 443b to an MCC in drill string 408. When placed below top drive 424 on derrick 404, EP manifold 420 becomes a structural element of drilling system 400. As such, EP manifold 420 supports the tension load caused by drill string 408. EP manifold 420 may be a stationary EP manifold (shown in more detail in FIG. 5) or a rotational EP manifold (shown in more detail in FIG. 6). A stationary EP manifold may be secured to derrick 404 via one or more strong arms 452 to prevent EP manifold 420 from rotating when top drive 424 rotates drill string 408, while a rotating EP manifold is suspended below top drive 424 to allow rotation.

Generator 440 and power-conditioning unit 442 may supply power to both top drive 424 and EP manifold 420. Switch 454 may be connected to power-conditioning unit 442 via cable 443. Switch 454 may alternatively supply power to top drive 424 and EP manifold 420. For example, during a subterranean operation with a rotary downhole tool, switch 454 may direct power from generator 440 and power-conditioning unit 442 through cable 443a to top drive 424. During a subterranean operation using a downhole electrical tool, switch 454 may direct power from generator 440 and power-conditioning unit 442 through cable 443b to EP manifold 420. Switch 454 may include power conditioning circuits to render power usable by both top drive 424 and the downhole electrical tool.

Lower connection 460 of EP manifold 420 may include threads (not expressly shown) and may be coupled to threads (not expressly shown) on drill string 408. Top drive 424 may rotate lower connection 460 to torque the threaded coupling between lower connection 460 and drill string 408. Drill string 408 includes an MCC (not expressly shown), such as MCC 230 shown in FIG. 2, inserted in the interior of drill string 408. The MCC electrically couples a downhole electrical tool to EP manifold 420 and thus to the power provided by generator 440 and power-conditioning unit 442.

Figure 5:
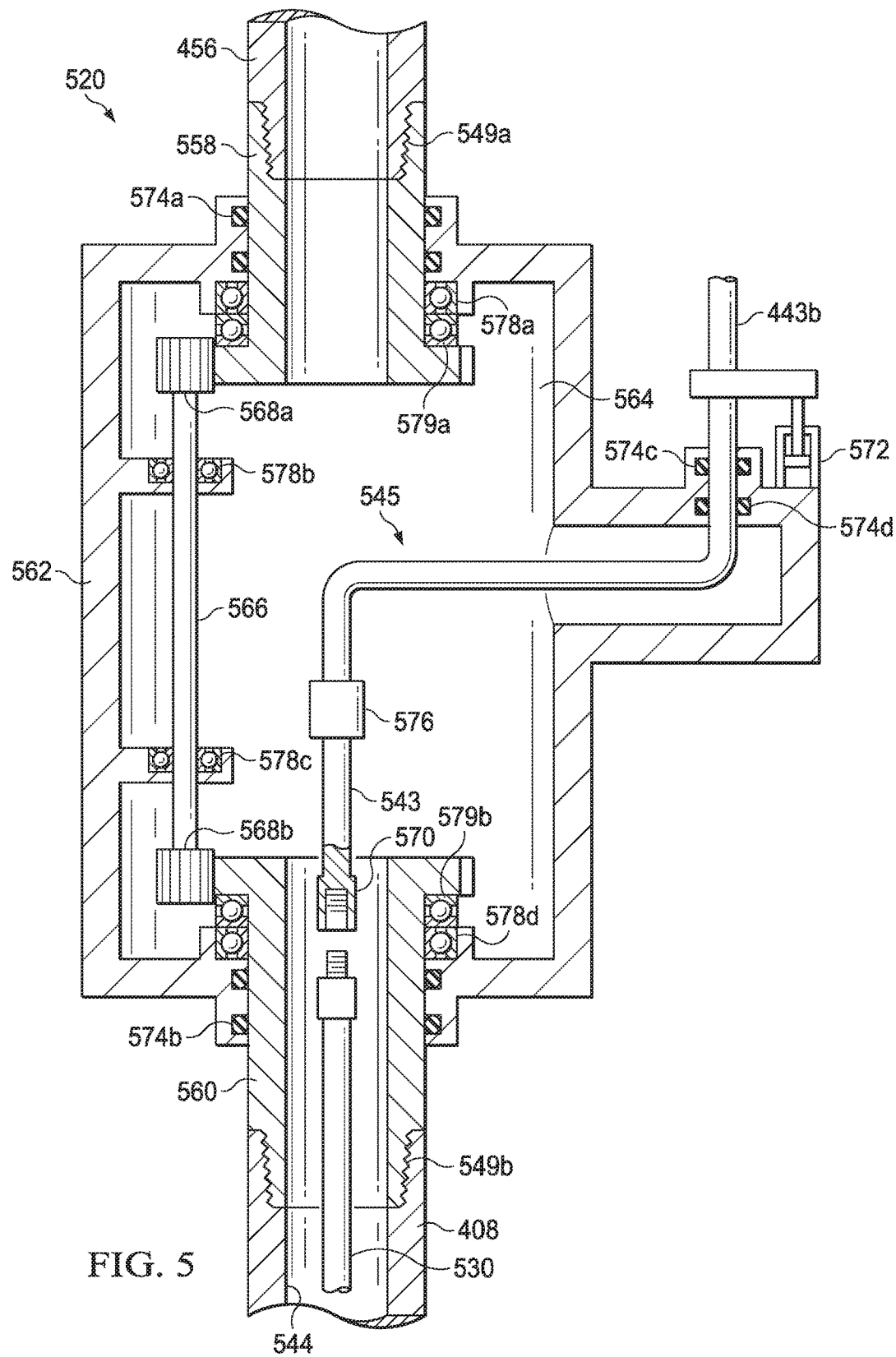
FIG. 5 is a cross-sectional view of a stationary electrical power manifold deployed below a top drive of a derrick.

FIG. 5 is a cross-sectional view of a stationary electrical power manifold deployed below a top drive of a derrick. Stationary EP manifold 520 is formed by housing 562, upper connection 558, and lower connection 560. Housing 562 may be secured to a derrick by a strong arm, as illustrated by strong arm 452 shown in FIG. 4. The strong arm prevents housing 562 from rotating when the top drive is operating. Housing 562 may be made of any material having sufficient strength to support the tensile load of drill string 408, compressive loads caused by vibrations of the downhole tools connected to drill string 408, and hydraulic pressure from pump 425 including steel, aluminum, and alloys thereof.

The top drive rotates drill string 408 via EP manifold 520. Upper connection 558 is coupled to lower connection 456 of the top drive. Upper connection 558 may be coupled to lower connection 456 of the top drive via threads 549a, as described in FIG. 4. Lower connection 560 may be coupled to drill string 408 via threads 549b. During operation, the top drive rotates lower connection 456 and thus also rotates upper connection 558. EP manifold 520 may also include idler gear 566 which transmits the rotation of upper connection 558 to lower connection 560. Idler gear 566 includes gears 568 at each end of a shaft. Gear 568a is coupled to upper connection 558 and gear 568b is coupled to lower connection 560. When upper connection 558 is rotated by the top drive, the rotation of upper connection 558 causes gear 568a to rotate. When gear 568a rotates, gear 568b also rotates at the same speed. The rotation of gear 568b causes lower connection 560 to rotate. Drill string 408 rotates when lower connection 560 rotates.

EP manifold 520 further includes stinger assembly 545 including cable 543, connector 570, and slip ring 576. Cables 443b and 543 may couple EP manifold 520 to a generator and/or power-conditioning unit, as described in more detail in FIG. 4. An end of cable 543 may include connector 570. Connector 570 may couple to MCC 530 to transmit power from the generator and/or power-conditioning unit through MCC 530 to a downhole electrical tool. Connector 570 may include a cleaning system to protect the electrical connection on MCC 530 from being contaminated by drilling fluid. The cleaning system may use high pressure air or nonconductive flushing fluid to remove drilling fluid from the electrical contacts on MCC 530 prior to coupling MCC 530 to connector 570.

During some drilling operations, drill string 408 and MCC 530 may rotate. Therefore, slip ring 576 may be located on cable 543 above connector 570 such that cable 543 rotates while in contact with rotating MCC 530 while cable 443b remains stationary. Thus slip ring 576 allows connector 570 to remain coupled to MCC 530 while the top drive is operating, such as when the top drive is used to rotate drill string 408 to couple multiple sections of drill string 408 together.

EP manifold 520 may further include actuator 572. Actuator 572 may raise and lower connector 570 such that connector 570 is electrically coupled to MCC 530 when connector 570 is in a lowered position and connector 570 is not electrically coupled to MCC 530 when connector 570 is in a raised position. Actuator 572 may place connector 570 in a raised position when the top drive is operating such that the rotation of drill string 408 does not cause cable 543 to rotate. When drill string 408 is not rotating, actuator 572 may lower connection 570 to electrically couple cable 543 and MCC 530 such that electrical power flows through MCC 530. Actuator 572 may be designed to raise and lower connection 570 based on the operating status of the top drive or may be actuated by an operator of the drilling equipment. Actuator 572 may additionally maintain the position of cables 443b and 543 when drilling fluid inside chamber 564 creates an internal pressure within housing 562 by preventing cables 443b and 543 from being forced out of EP manifold 520.

Drilling fluid may flow through the top drive, through upper connection 558, and enter chamber 564 formed in the interior of housing 562. The drilling fluid flows through chamber 564 and into annulus 544 formed between drill string 408 and MCC 530, as described in more detail with respect to FIGS. 2 and 3. EP manifold 520 may additionally include one or more seals 574 to maintain the pressure of the drilling fluid within chamber 564 and prevent drilling fluid from leaking from chamber 564 where housing 562 is coupled to upper connection 558 and lower connection 560 and where cable 543 enters housing 562. Seals 574 may be any suitable seal type including an O-ring, a V-ring, or a lip seal. Seals 574 may be made of any suitable elastomeric material. The elastomeric material may be formed of compounds including, but not limited to, natural rubber, nitrile rubber, hydrogenated nitrile, urethane, polyurethane, fluorocarbon, perflurocarbon, propylene, neoprene, hydrin, etc., or a soft material including, but not limited to, bronze and brass.

EP manifold 520 may additionally include one or more bearings 578 to reduce friction between rotational components. For example, bearing 578a may reduce friction between upper connection 558 and housing 562 when upper connection 558 rotates. Bearings 578b and 578c may reduce the friction between shaft 566 and the supports for shaft 566 when shaft 566 rotates. Bearing 578d may reduce the friction between lower connection 560 and housing 562 when lower connection 560 rotates. Bearings 578a and 578d may be radial bearings that maintain the placement of upper connection 558 and lower connection 560 within the center of the corresponding openings in housing 562. Bearings 578b and 578c may be radial bearings that maintain the placement of shaft 566 in the center of the corresponding openings in the supports for shaft 566. Bearings 578 may be any suitable type of bearing including a bushing, journal bearing, sleeve bearing, rifle bearing, ball bearing, roller bearing, fluid bearing, or magnetic bearing.

EP manifold 520 may additionally include one or more thrust bearings 579 to prevent the pressure inside of housing 562 from causing axial movement of upper connection 558 and lower connection 560. For example, thrust bearing 579a may prevent upper connection 558 from moving in an axial direction such that upper connection 558 wears against bearing 578a and/or housing 562. Thrust bearing 579b may prevent lower connection 560 from moving in an axial direction such that lower connection 560 wears against bearing 578d and/or housing 562. Thrust bearings 579a and 579b may be any suitable type of bearing including a washer, journal bearing, rifle bearing, ball bearing, roller bearing, fluid bearing, or magnetic bearing. In some examples, the functions of bearings 578 and 579 may be combined into a taper bearing that combines the load handling characteristics of bearings 578 and bearings 579.

Figure 6:
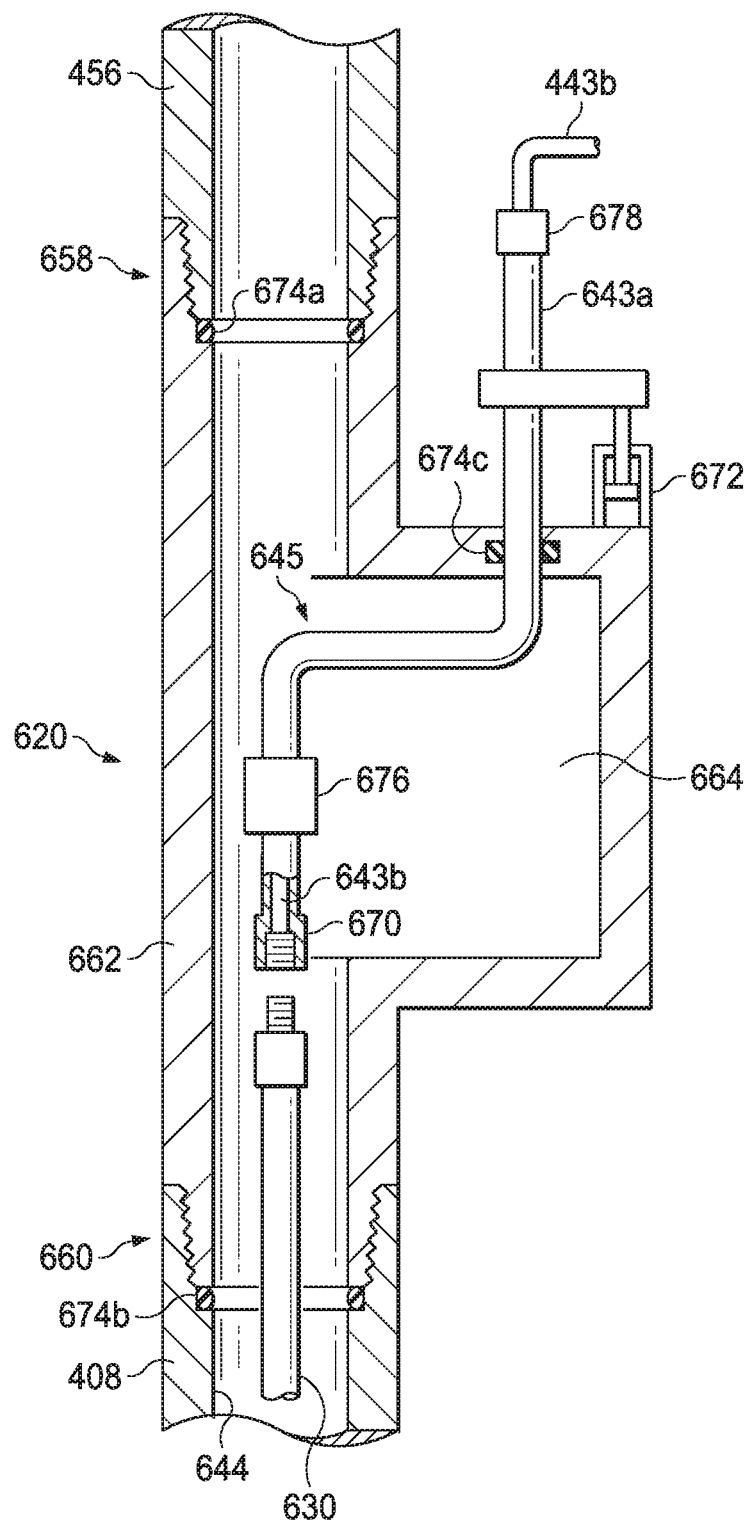
FIG. 6 is a cross-sectional view of a rotating electrical power manifold deployed below a top drive of a derrick.

FIG. 6 is a cross-sectional view of a rotating electrical power manifold deployed below a top drive of a derrick. Rotating EP manifold 620 is formed by housing 662. Housing 662 may be made of any material having sufficient strength to support the tensile load of drill string 408 and compressive loads caused by vibrations of the downhole tools connected to drill string 408 including steel, aluminum, and alloys thereof.

The top drive rotates drill string 408 via EP manifold 620. Upper connection 658 and lower connection 660 of housing 662 may be threaded such that upper connection 658 of housing 662 is coupled to lower connection 456 of the top drive and lower connection 660 is coupled to drill string 408. During operation of the top drive, lower connection 456 rotates. The rotation of lower connection 456 causes housing 662 of EP manifold 620 to rotate. Drill string 408 rotates when housing 662 rotates.

EP manifold 620 further includes stinger assembly 645 including cables 643a and 643b, connectors 670 and 678, and slip ring 676. Cables 643a-b may couple EP manifold 620 to a generator and/or power-conditioning unit, as described in more detail in FIG. 4. An end of cable 643b may include connector 670 that couples to MCC 630 to transmit power from the generator and/or power-conditioning unit through MCC 630 to a downhole electrical tool. Connector 670 may also include a cleaning system to protect the electrical connection on MCC 630 from contamination by the drilling fluid. The cleaning system may use high pressure air or non-conductive flushing fluid to remove drilling fluid from the electrical contacts on MCC 630 prior to coupling MCC 630 to connector 670.

Stinger assembly 645 may further include second connector 678 located outside of housing 662. When EP manifold 620 is rotating, connector 678 may be disconnected to prevent twisting of cable 443b during the rotation.

EP manifold 620 may further include actuator 672, which raises and lowers connector 670 to engage and disengage connector 670 from MCC 630. For example, connector 670 is electrically coupled to MCC 630 when connector 670 is in a lowered position and connector 670 is not electrically coupled to MCC 630 when connector 670 is in a raised position. Actuator 672 may be designed to raise and lower connection 670 based on the operating status of the top drive or may be actuated by an operator of the drilling equipment. Actuator 672 may additionally maintain the position of cables 443b and 643 when drilling fluid inside chamber 664 creates an internal pressure within housing 662 by preventing cables 443b and 643 from being forced out of EP manifold 620.

Drilling fluid may flow through lower connection 456 of the top drive and upper connection 658 of EP manifold 620 to enter chamber 664 formed in the interior of housing 662. The drilling fluid flows through chamber 664 and into annulus 644 formed between drill string 408 and MCC 630, as described in more detail in FIGS. 2 and 3. EP manifold 620 may additionally include one or more seals 674 to maintain the pressure of the drilling fluid within chamber 664 and prevent drilling fluid from leaking from chamber 664 where housing 662 is coupled to lower connection 456 of the top drive, where housing 662 is coupled to drill string 408, and where cable 643b enters housing 662. Seals 674 may be any suitable seal type including an O-ring, a V-ring, or a lip seal. Seals 674 may be made of any suitable elastomeric material. The elastomeric material may be formed of compounds including, but not limited to, natural rubber, nitrile rubber, hydrogenated nitrile, urethane, polyurethane, fluorocarbon, perflurocarbon, propylene, neoprene, hydrin, etc., or a soft material including, but not limited to, bronze and brass.

Figure 7:
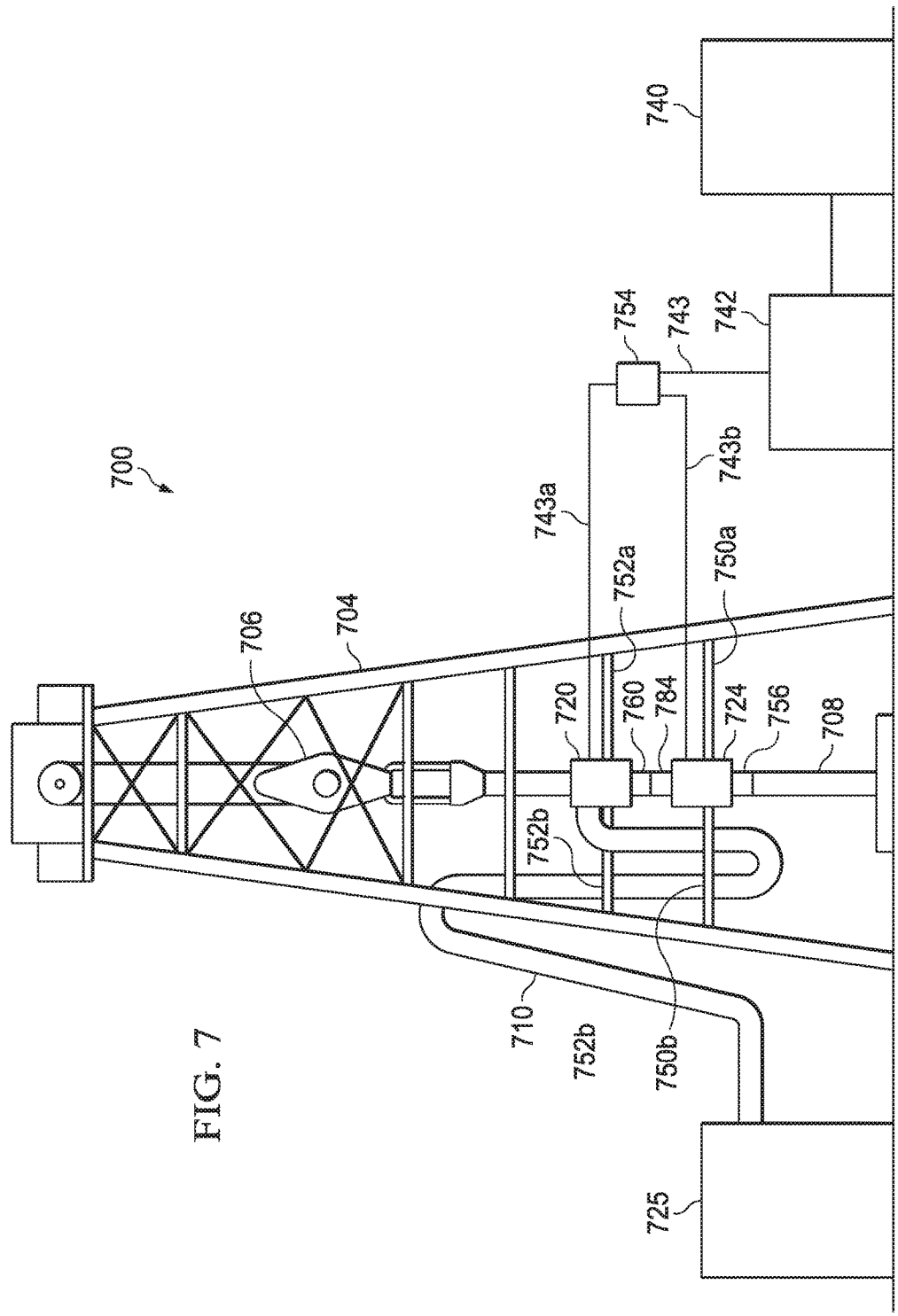
FIG. 7 is a perspective view of a derrick including an electrical power manifold located above a top drive configured to electrically connect a surface power generator to a downhole electrical tool.

FIG. 7 is a perspective view of a derrick including an electrical power manifold located above a top drive configured to electrically connect a surface power generator to a downhole electrical tool. Derrick 704 may include traveling block 706 coupled to EP manifold 720. EP manifold 720 may be secured to derrick 704 by one or more strong arms 752 that prevent EP manifold 720 from rotating when top drive 724 rotates drill string 708.

Top drive 724 may be located below EP manifold 720. Lower connection 760 of EP manifold 720 may include threads (not expressly shown) and may be torqued to threads (not expressly shown) on upper connection 784 of top drive 724. Top drive 724 may rotate upper connection 784 to torque the threaded coupling between lower connection 760 and upper connection 784. Top drive 724 may be secured to derrick 704 by one or more strong arms 750 that prevent the housing of top drive 724 from rotating when top drive 724 rotates drill string 708. Drilling pumps 725 may pump drilling fluid into top drive 724 via kelly hose 710.

EP manifold 720 couples generator 740 and power-conditioning unit 742 to a downhole electrical tool in order to provide power to the downhole electrical tool. For example, EP manifold 720 may include a stinger assembly (shown in more detail in FIG. 8) that couples cable 743a to an MCC in drill string 708. EP manifold 720 may be a stationary EP manifold (shown in more detail in FIG. 8). When EP manifold 720 is placed above top drive 724 on derrick 704, top drive 724 supports the tension load caused by drill string 708.

Generator 740 and power-conditioning unit 742 may supply power to both top drive 724 and EP manifold 720. Switch 754 may be connected to power-conditioning unit 742 via cable 743. Switch 754 may be used to alternate the supply of power to top drive 724 and EP manifold 720. For example, during a subterranean operation with a rotary downhole tool, switch 754 may direct power from generator 740 and power-conditioning unit 742 through cable 743b to top drive 724 in order to rotate drill string 708. Alternatively, during subterranean operations using a downhole electrical tool, switch 754 may direct power from generator 740 and power-conditioning unit 742 to EP manifold 720 via cable 743a in order to provide power to the downhole electrical tool through MCC. Switch 754 may include power conditioning circuits to render power usable by both top drive 724 and the downhole electrical tool.

Lower connection 756 of top drive 724 is coupled to drill string 708. Lower connection 756 may be coupled to drill string 708 via a threaded connection (not expressly shown). Top drive 724 may rotate lower connection 756 to torque the threaded connection between lower connection 756 and drill string 708. Drill string 708 includes an MCC (not expressly shown), such as MCC 230 shown in FIG. 2, inserted in the interior of drill string 708. The MCC electrically couples a downhole electrical tool to EP manifold 720 such that power provided by generator 740 and power-conditioning unit 742 is communicated to the downhole electrical tool.

Figure 8:
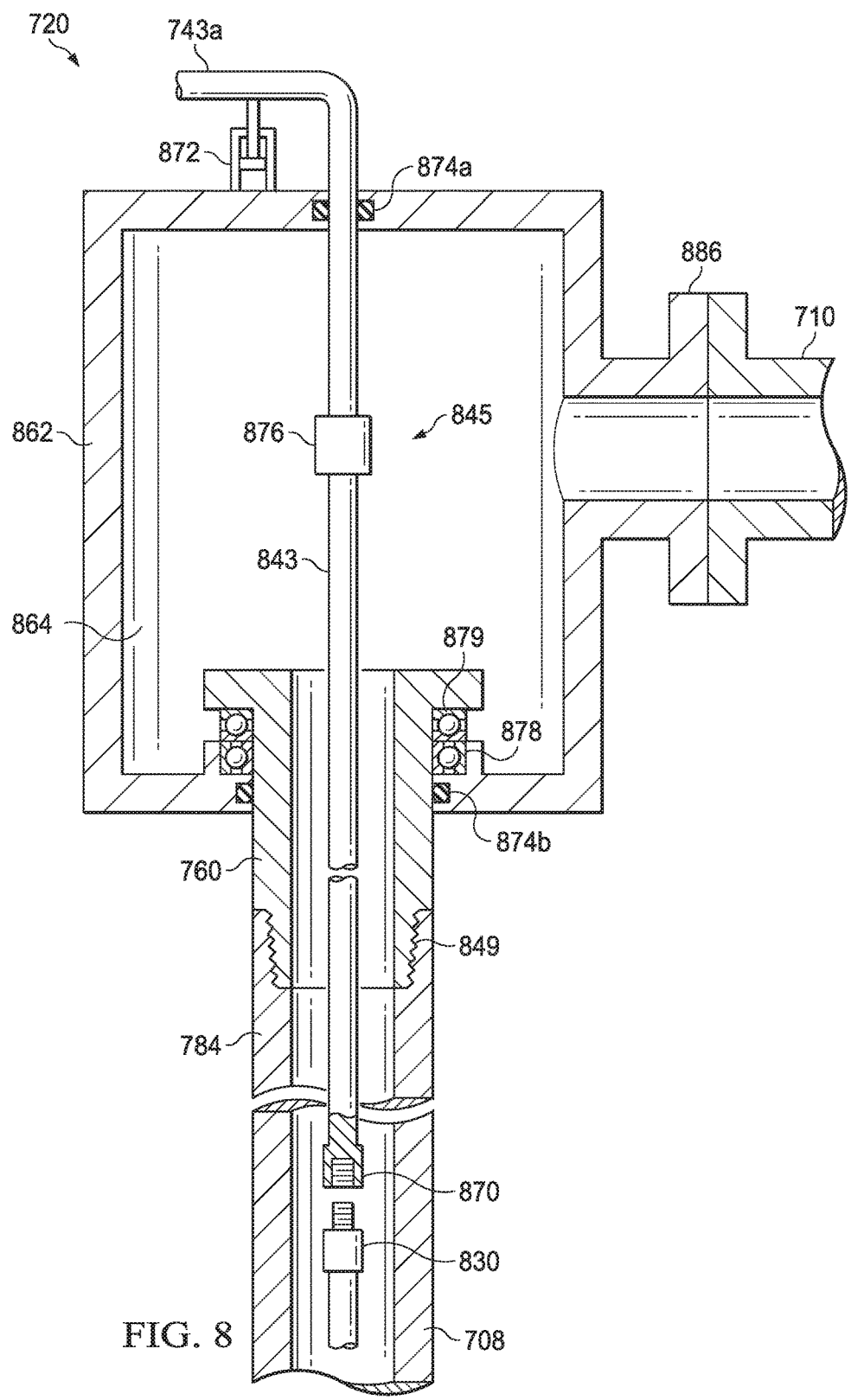
FIG. 8 is a cross-sectional view of a stationary electrical power manifold deployed above a top drive of a derrick.

FIG. 8 is a cross-sectional view of a stationary electrical power manifold deployed above a top drive of a derrick. Stationary EP manifold 720 is formed by housing 862 and lower connection 760. Housing 862 may be secured to a derrick by a strong arm, as illustrated by strong arm 752 shown in FIG. 7. The strong arm prevents housing 862 from rotating when the top drive is operating. Housing 862 may be made of any suitable material including steel, aluminum, and alloys thereof. Lower connection 760 is coupled to upper connection 784 of the top drive. Lower connection 760 and upper connection 784 may be coupled via threads 849, as described in FIG. 7.

EP manifold 720 further includes stinger assembly 845 including cable 843, connector 870, and slip ring 876. Cables 743a and 843 may couple EP manifold 720 to a generator and/or power-conditioning unit, as described in more detail in FIG. 7. Cable 843 may pass through the top drive to couple to MCC 830 in drill string 708 coupled to the lower connection of the top drive. An end of cable 843 may include connector 870 which may couple to MCC 830 to transmit power from the generator and/or power-conditioning unit through MCC 830 to a downhole electrical tool. Connector 870 may also include a cleaning system to protect the electrical connection on MCC 830 from contamination from drilling fluid. The cleaning system may use high pressure air or non-conductive flushing fluid to remove drilling fluid from the electrical contacts on MCC 830 prior to coupling MCC 830 to connector 870.

During some drilling operations, drill string 708 and MCC 830 may rotate. When cable 843 is coupled to MCC 830, the rotation of MCC 830 during a rotary drilling operation may cause cable 843 to rotate. Slip ring 876 may be located on cable 843 above connector 870. During rotation of cable 843, slip ring 876 may allow cable 743a to remain stationary while maintaining the electrical coupling of cable 743a and cable 843. In cases where EP manifold 720 includes slip ring 876, connector 870 may remain coupled to MCC 830 while the top drive is operating, such as when the top drive is used to rotate drill string 708 to couple multiple sections of drill string 708 together.

EP manifold 720 may further include actuator 872, which raises and lowers connector 870 to engage and disengage connector 870 from MCC 830. For example, connector 870 is electrically coupled to MCC 830 when connector 870 is in a lowered position and connector 870 is not electrically coupled to MCC 830 when connector 870 is in a raised position. During operation of the top drive and while drill string 708 is rotating, actuator 872 may raise connector 870 to disengage connector 870 from MCC 830 such that the rotation of drill string 708 and MCC 870 does not cause cable 843 to rotate. When the rotation of drill string 708 stops, actuator 872 may lower connection 870 to electrically couple cable 843 and MCC 830 such that power flows from the generator and power conditioning unit through MCC 830. Actuator 872 may be designed to raise and lower connection 870 based on the operating status of the top drive or may be actuated by an operator of the drilling equipment. Actuator 872 may additionally maintain the position of cables 743a and 843 when drilling fluid inside the top drive creates an internal pressure within housing 862 by preventing cables 743a and 843 from being forced out of EP manifold 720.

In some examples, drilling fluid may flow into the top drive via a kelly line, as shown in FIG. 7. In other examples, drilling fluid may flow into EP manifold 720 from kelly hose 710 at kelly port 886 located in housing 862. The drilling fluid may flow through EP manifold 720, through lower connection 760, through the top drive and into drill string 708. EP manifold 720 may additionally include one or more seals 874 to maintain the pressure of the drilling fluid within chamber 864 and prevent drilling fluid from leaking from chamber 864 where housing 862 is coupled to lower connection 760 and where cable 843 enters housing 862. Seals 874 may be any suitable seal type including an O-ring, a V-ring, or a lip seal. Seals 874 may be made of any suitable elastomeric material. The elastomeric material may be formed of compounds including, but not limited to, natural rubber, nitrile rubber, hydrogenated nitrile, urethane, polyurethane, fluorocarbon, perflurocarbon, propylene, neoprene, hydrin, etc., or a soft material including, but not limited to, bronze and brass.

EP manifold 720 may additionally include one or more bearings 878 to reduce friction between rotational components. For example, bearing 878 may reduce the friction between lower connection 760 and housing 862 when lower connection 760 rotates. Bearing 878 may be a radial bearing that maintain the placement of lower connection 760 within the center of the corresponding openings in housing 862. Bearings 878 may be any suitable type of bearing including a bushing, journal bearing, sleeve bearing, rifle bearing, ball bearing, roller bearing, fluid bearing, or magnetic bearing.

EP manifold 720 may additionally include one or more thrust bearings 879 to prevent the pressure inside of housing 862 from causing axial movement of lower connection 760. For example, thrust bearing 879 may prevent lower connection 760 from moving in an axial direction such that lower connection 760 wears against bearing 878 and/or housing 862. Thrust bearing 879 may be any suitable type of bearing including a washer, journal bearing, sleeve bearing, ball bearing, roller bearing, fluid bearing, or magnetic bearing. In some examples, the functions of bearings 878 and 879 may be combined into a taper bearing that combines the load handling characteristics of bearing 878 and thrust bearing 879.

Figure 9:
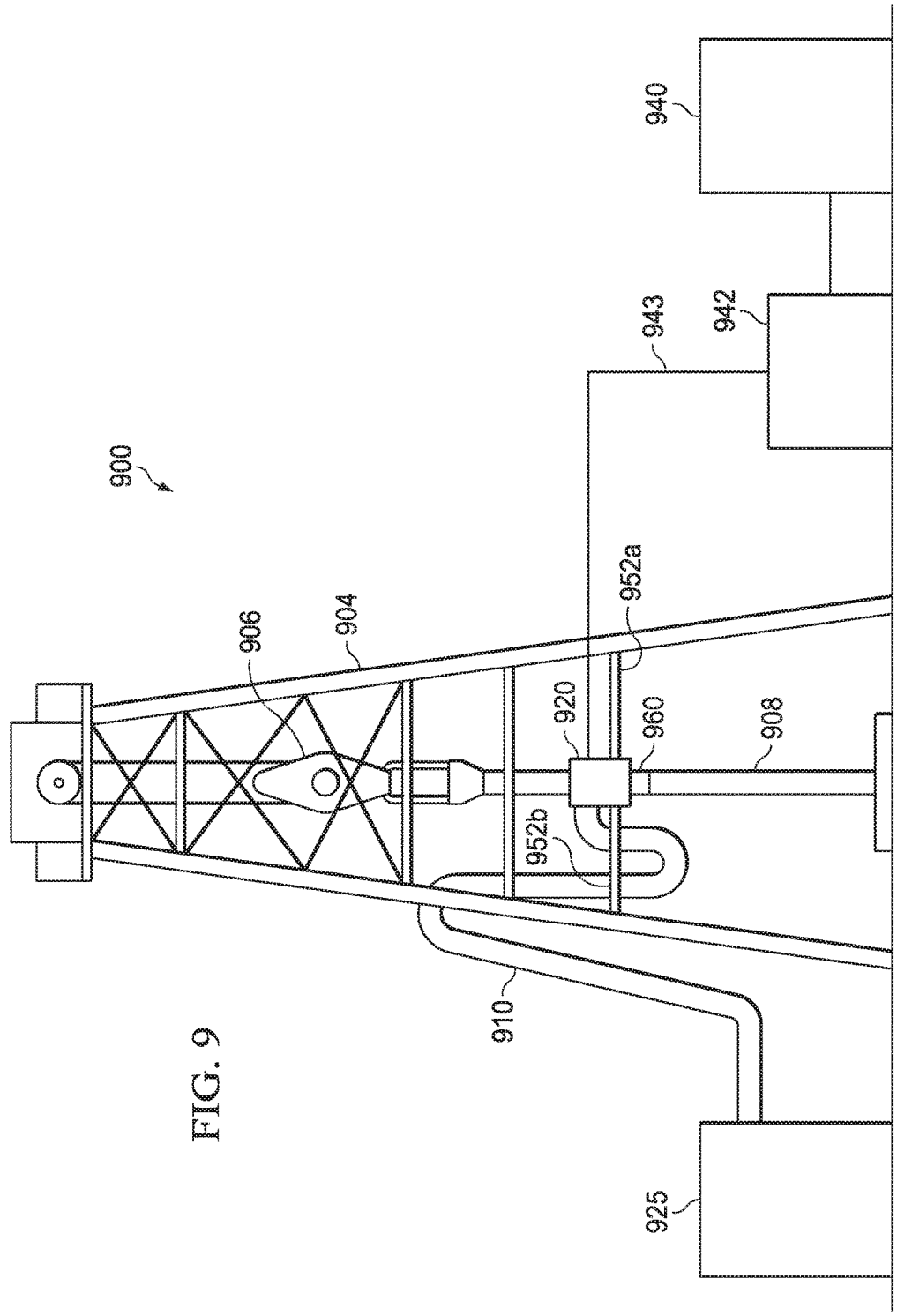
FIG. 9 is a perspective view of a derrick including an electrical power manifold configured to electrically connect a surface power generator to a downhole electrical tool.

FIG. 9 is a perspective view of a derrick including an electrical power manifold configured to electrically connect a surface power generator to a downhole electrical tool. Derrick 904 may include traveling block 906 coupled to EP manifold 920. When converting between a rotary drilling operating and an operation using a downhole electrical tool, the top drive may no longer be used and may be removed and EP manifold 920 may be installed in place of the top drive. EP manifold 920 may be secured to derrick 904 by one or more strong arms 952. Drilling pumps 925 may pump drilling fluid into EP manifold 920 via kelly hose 910. EP manifold 920 couples generator 940 and power-conditioning unit 942 to a downhole electrical tool in order to provide power to the downhole electrical tool. EP manifold 920 may be a stationary EP manifold (shown in more detail in FIG. 10).

Lower connection 960 of EP manifold 920 is coupled to drill string 908. Lower connection 960 may be a threaded connection and power tongs, a tool rotary, a rotary table, or a draw-works may be used to spin lower connection 960 to couple lower connection 960 to drill string 908. Drill string 908 includes an MCC (not expressly shown), such as MCC 230 shown in FIG. 2, inserted in the interior of drill string 908. The MCC electrically couples a downhole electrical tool to EP manifold 920 and thus to the power provided by generator 940 and power-conditioning unit 942.

Figure 10:
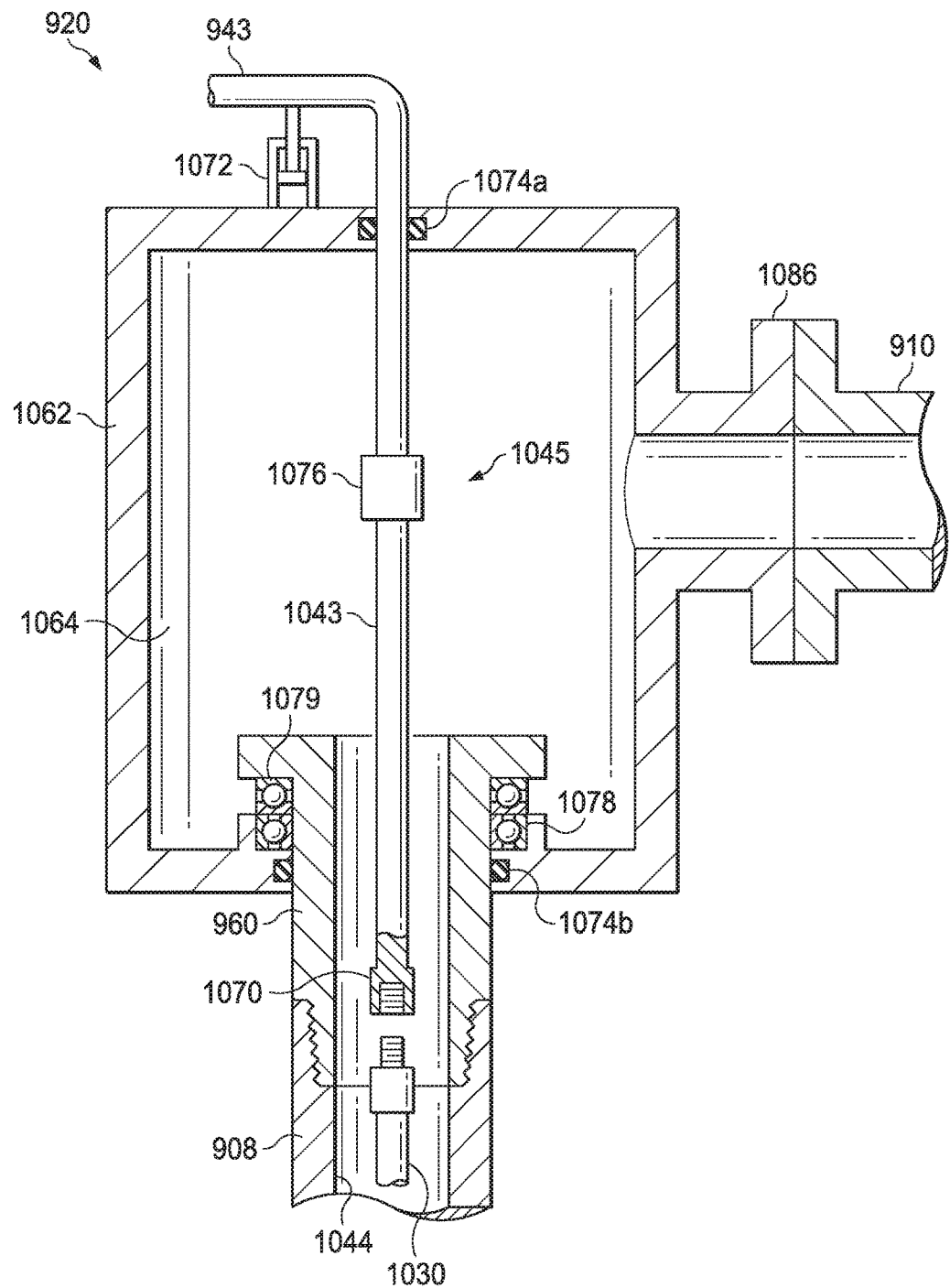
FIG. 10 is a cross-sectional view of a stationary electrical power manifold deployed in place of a top drive of a derrick.

FIG. 10 is a cross-sectional view of a stationary electrical power manifold deployed in place of a top drive of a derrick. Stationary EP manifold 920 is formed by housing 1062 and lower connection 960. Housing 1062 may be secured to a derrick by a strong arm, as illustrated by strong arm 952 shown in FIG. 9. Housing 1062 may be made of any material having sufficient strength to support the tensile load of drill string 908 and compressive loads caused by vibrations of the downhole tools connected to drill string 908 including steel, aluminum, and alloys thereof. Lower connection 960 is coupled to drill string 908. Lower connection 960 and drill string 908 may be coupled via a threaded connection. Power tongs, a tool rotary, a rotary table, or a draw-works may be used to spin lower connection 960 to couple lower connection 960 to drill string 908.

EP manifold 920 further includes stinger assembly 1045 including cable 1043, connection 1070, and slip ring 1076. Cables 943 and 1043 may couple EP manifold 920 to a generator and/or power-conditioning unit, as described in more detail in FIG. 9. Cable 1043 may pass through housing 1062 to couple to MCC 1030 in drill string 908. An end of cable 1043 may include connector 1070 to couple to MCC 1030 to transmit power from the generator and/or power-conditioning unit through MCC 1030 to a downhole electrical tool. Connector 1070 may also include a cleaning system to protect the electrical connection on MCC 1030 from contamination from drilling fluid. The cleaning system may use high pressure air or non-conductive flushing fluid to remove drilling fluid from the electrical contacts on MCC 1030 prior to coupling MCC 1030 to connector 1070.

Slip ring 1076 may be located on cable 1043 above connector 1070. When drill string 908 and MCC 1030 rotate, such as when coupling connections between sections of drill string 908, cable 1043 may rotate if connector 1070 is coupled to MCC 1030. Slip ring 1076 may allow cable 1043 to rotate and cable 943 to remain stationary while cables 943 and 1043 are electrically coupled. Thus, in cases where EP manifold 920 includes slip ring 1076, connector 1070 may remain coupled to MCC 1030 while drill string 908 rotates such as when drill string 908 is rotated to torque connections.

EP manifold 920 may further include actuator 1072. Actuator 1072 may raise and lower connector 1070 such that connector 1070 is electrically coupled to MCC 1030 when connector 1070 is in a lowered position and connector 1070 is not electrically coupled to MCC 1030 when connector 1070 is in a raised position. Actuator 1072 may place connector 1070 in a raised position when drill string 908 is rotating such that cable 1043 does not rotate. When drill string 908 is not rotating, actuator 1072 may lower connection 1070 to electrically couple cable 1043 and MCC 1030 such that electrical power flows through MCC 1030. Actuator 1072 may be designed to raise and lower connection 1070 based on the operating status of the top drive or may be actuated by an operator of the drilling equipment. Actuator 1072 may additionally keep cables 943 and 1043 in place when drilling fluid inside chamber 1064 creates an internal pressure within housing 1062 by preventing cables 943 and 1043 from being forced out of EP manifold 920.

Drilling fluid may flow into EP manifold 920 from kelly hose 910 at kelly port 1086 located in housing 1062. The drilling fluid may flow through EP manifold 920, through lower connection 960 and into drill string 908. EP manifold 920 may additionally include one or more seals 1074 to maintain the pressure of the drilling fluid within chamber 1064 and prevent drilling fluid from leaking from chamber 1064 where housing 1062 is coupled to lower connection 960 and where cable 1043 enters housing 1062. Seals 1074 may be any suitable seal type including an O-ring, a V-ring, or a lip seal. Seals 1074 may be made of any suitable elastomeric material. The elastomeric material may be formed of compounds including, but not limited to, natural rubber, nitrile rubber, hydrogenated nitrile, urethane, polyurethane, fluorocarbon, perflurocarbon, propylene, neoprene, hydrin, etc., or a soft material including, but not limited to, bronze and brass. The drilling fluid flows through chamber 1064 and into annulus 1044 formed between drill string 908 and MCC 1030, as described in more detail with respect to FIGS. 2 and 3.

EP manifold 920 may additionally include one or more bearings 1078 to reduce friction between rotational components. For example, bearing 1078 may reduce the friction between lower connection 960 and housing 1062 when lower connection 960 rotates. Bearing 1078 may be a radial bearing that maintain the placement of lower connection 960 within the center of the corresponding openings in housing 1062. Bearings 1078 may be any suitable type of bearing including a bushing, journal bearing, sleeve bearing, rifle bearing, ball bearing, roller bearing, fluid bearing, or magnetic bearing.

EP manifold 920 may additionally include one or more thrust bearings 1079 to prevent the pressure inside of housing 1062 from causing axial movement of lower connection 960. For example, thrust bearing 1079 may prevent lower connection 960 from moving in an axial direction such that lower connection 960 wears against bearing 1078 and/or housing 1062. Thrust bearing 1079 may be thrust bearings and may be any suitable type of bearing including a washer, journal bearing, sleeve bearing, ball bearing, roller bearing, fluid bearing, or magnetic bearing. In some examples, the functions of bearings 1078 and 1079 may be combined into a taper bearing that combines the load handling characteristics of bearing 1078 and thrust bearing 1079.

Figure 11:
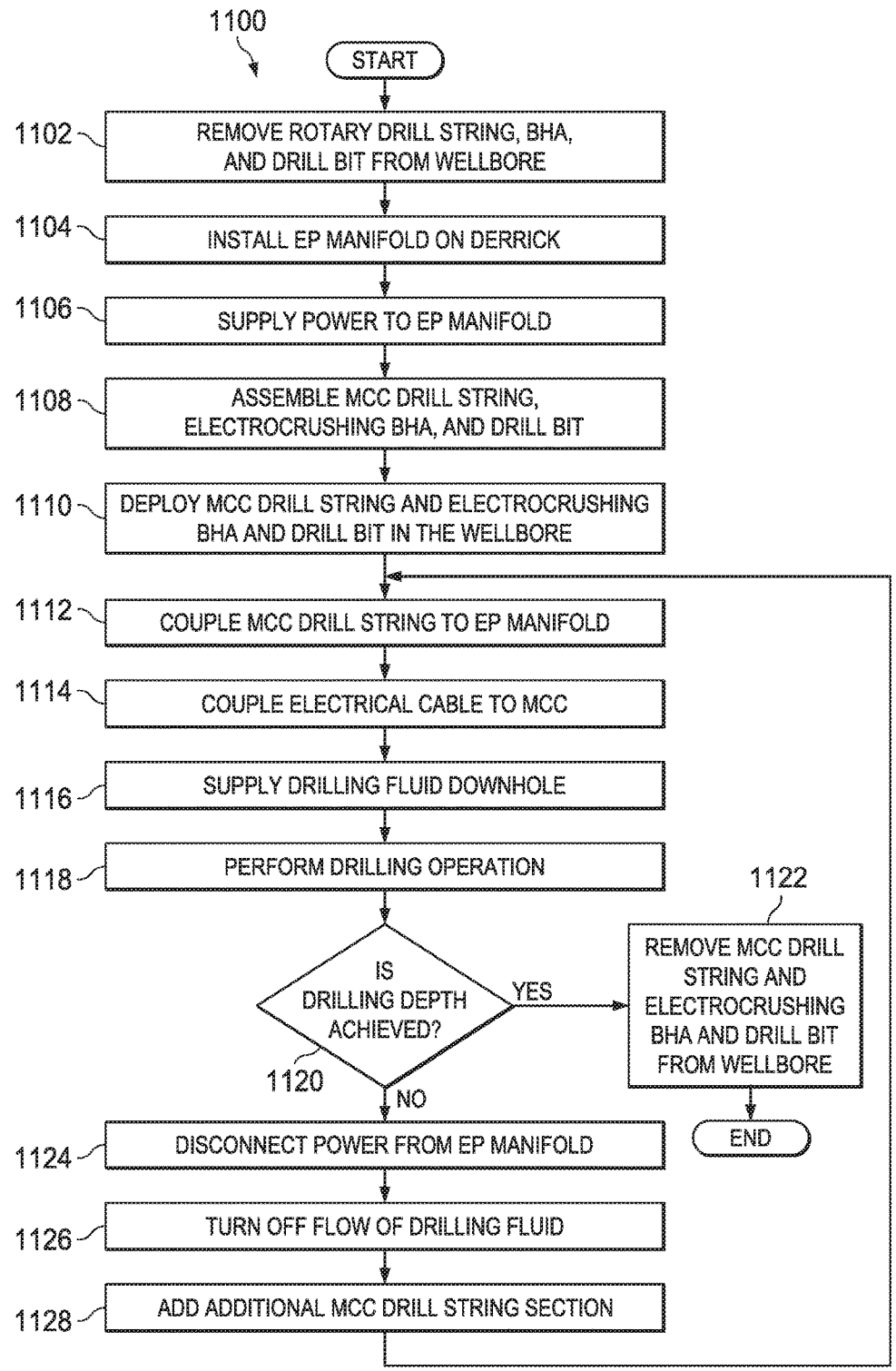
FIG. 11 is a flow chart depicting steps for operating an electrocrushing drill bit with an electrical power manifold.

In some cases, the downhole electrical tool is an electrocrushing drill bit, such as electrocrushing drill bit 114 shown in FIG. 1. FIG. 11 is a flow chart depicting steps for operating an electrocrushing drill bit with an EP manifold. Method 1100 may begin at step 1102 where an operator of a drilling rig may remove the rotary drill string, BHA, and drill bit from the wellbore. The operator may remove the rotary drilling equipment when the rotary drilling equipment reaches a hard rock formation where drilling through the hard rock may be performed more efficiently using an electrocrushing drill bit. Likewise, step 1102 may be optional if electrocrushing drilling commences directly below the surface casing.

At step 1104, the operator may install an EP manifold on a derrick. The EP manifold may be installed below a top drive, as illustrated in FIG. 4, above the top drive, as illustrated in FIG. 7, or the top drive may be removed and the EP manifold may be installed in place of the top drive, as illustrated in FIG. 9. The EP manifold may be coupled to the top drive via threaded connections. The top drive, power tongs, a rotary table, a tool rotary, or a draw-works may be used to torque the threaded connections.

At step 1106, the operator may supply power to the EP manifold. The power may be supplied by coupling a power cable to the EP manifold, such as cables 443b, 743a, or 943, shown in FIGS. 4, 7, and 9, respectively. The operator may then direct power from the top drive, such as by changing the position of switch 454 or switch 754 shown in FIGS. 4 and 7, respectively, or by powering on a generator and/or a power-conditioning unit.

At step 1108, the operator may assemble an MCC drill string, electrocrushing BHA, and electrocrushing drill bit. The MCC drill string may include an MCC extending through the center of the MCC drill string, as illustrated in FIG. 2. The operator may couple the electrocrushing drill bit to the electrocrushing BHA and couple the electrocrushing BHA to a section of MCC drill string. The operator may then lower the drill bit and BHA into the wellbore and continue to connect sections of the MCC drill string together until the MCC drill string extends the length of the wellbore. An example of a connection at one end of a MCC drill string section is shown in FIG. 3. The sections of MCC drill string may be coupled together via threaded connections. The top drive, power tongs, a rotary table, a tool rotary, or a draw-works may be used to torque the threaded connections.

At step 1110, the operator may deploy the MCC drill string and electrocrushing BHA and drill bit into the well. In some cases, steps 1108 and 1110 are performed simultaneously. Steps 1108 & 1110 may involve deployment of a rigid or flexible conductor 334 assembly inside the drill string. During this process, special handling tools may be used to grip and secure the assembly during connection makeup.

At step 1112, the operator may couple the uphole end of the MCC drill string to the EP manifold. The MCC drill string and EP manifold may be coupled directly, as shown in FIGS. 4, and 9, or indirectly, as shown in FIG. 7. The MCC drill string and the EP manifold may be coupled together via threaded connections. The top drive, power tongs, a rotary table, a tool rotary, or a draw-works may be used to torque the threaded connections.

At step 1114, the operator may couple the cable to the MCC in MCC drill string to couple power from generators to the MCC. The cable and MCC may be coupled by lowering a connector on the cable until the connector is coupled to the MCC. The connector—such as connector 570, 670, 870, or 1070 shown in FIGS. 5, 6, 8, and 10, respectively—may be lowered by activating an actuator on the EP manifold, such as actuator 572, 672, 872, or 1072 shown in FIGS. 5, 6, 8, and 10, respectively. In some cases, before the cable and MCC are coupled, a cleaning system in the connector may be used to remove any contamination from the end of the MCC. For example, the cleaning system may use high pressure air or non-conductive flushing fluid to remove drilling fluid from the electrical contacts on the MCC.

At step 1116, the operator may supply drilling fluid downhole to the electrocrushing BHA and drill bit. The operator may supply the drilling fluid by turning on a drilling fluid pump, such as pump 125 shown in FIG. 1. The drilling fluid may flow into the top drive, as shown in FIGS. 4 and 7, or into the EP manifold, as shown in FIG. 9. The drilling fluid then flows through the annulus formed between the inner wall of the MCC drill string and the outer wall of the MCC, such as annulus 244 shown in FIG. 2.

At step 1118, the electrocrushing drill bit may perform a drilling operation. The drilling operating may continue until the electrocrushing drill bit reaches a depth where another section of MCC drill string should be added to allow the electrocrushing drill bit to drill the formation.

At step 1120, the operator may determine whether the drilling depth has been achieved. The drilling depth may be achieved when the wellbore reaches a reservoir or when the electrocrushing drill bit has completed drilling through a hard rock formation and the operator wishes to resume drilling with rotary drilling tools. If the drilling depth has been achieved, method 1100 may proceed to step 1122 where the operator may remove the MCC drill string and electrocrushing BHA and drill bit from the wellbore. Otherwise, method 1100 may proceed to step 1124.

At step 1124, the operator may disconnect power from the EP manifold. The power may be disconnected by adjusting the position of a switch, such as switches 454 or 754 shown in FIGS. 4 and 7, respectively, by disconnecting the cable, or by turning the generator off.

At step 1126, the operator may turn off the flow of drilling fluid by turning off the drilling pumps. The operator may additionally vent drilling fluid to below the coupling between the MCC and the connector on the electrical cable so that when the connector is raised from the MCC, the electrical contacts are not contaminated with drilling fluid.

At step 1128, the operator may add an additional section of MCC drill string to the existing MCC drill string. The sections of MCC drill string may be coupled together via threaded connections. The top drive, power tongs, a rotary table, a tool rotary, or a draw-works may be used to torque the threaded connections. Method 1100 may then return to step 1112 to continue the drilling operation.

Modifications, additions, or omissions may be made to method 1100 without departing from the scope of the disclosure. For example, the order of the steps may be performed in a different manner than that described above and some steps may be performed at the same time. Additionally, each individual step may include additional steps without departing from the scope of the present disclosure.

Embodiments disclosed herein include:

A. An electrical conveyance system including an electrical power manifold, a drill string coupled to the electrical power manifold, a multi-conductor conduit extending through an interior of the drill string, a stinger assembly extending from an exterior of the electrical power manifold to an interior of the electrical power manifold to couple the multi-conductor conduit to an electrical power source, and a downhole tool coupled to the drill string and the multi-conductor conduit.

B. An electrical power manifold including a housing, a chamber formed within the housing, an upper connection formed on an uphole end of the housing, a lower connection formed on a downhole end of the housing, and a stinger assembly extending from an exterior of the electrical power manifold to an interior of the electrical power manifold to couple a multi-conductor conduit in a drill string to an electrical power source.

C. A method for conveying electrical power to a downhole tool including installing a drill string in a wellbore, the drill string containing a multi-conductor conduit extending through the interior of the drill string, coupling a downhole end of the drill string to a downhole tool and an uphole end of the drill string to an electrical power manifold, supplying power to the electrical power manifold, and performing a subterranean operation using the downhole tool.

Each of embodiments A, B, and C may have one or more of the following additional elements in any combination: Element 1: further comprising a top drive coupled to the electrical power manifold. Element 2: wherein a lower connection of the top drive is coupled to an upper connection of the electrical power manifold. Element 3: wherein an upper connection of the top drive is coupled to a lower connection of the electrical power manifold. Element 4: wherein the multi-conductor conduit further includes a plurality of centralizing fins separating an outer wall of the multi-conductor conduit from an inner wall of the drill string to create an annulus between the outer wall of the multi-conductor conduit and the inner wall of the drill string. Element 5: wherein the stinger assembly further includes a stationary cable, a rotating cable, and a slip ring coupling the stationary cable and the rotating cable. Element 6: wherein the electrical power manifold further includes a seal positioned at an opening in a housing of the electrical power manifold. Element 7: wherein the electrical power manifold further includes a connector coupling the multi-conductor conduit to the stinger assembly, and an actuator coupled to the stinger assembly to raise and lower the connector such that the connector couples the multi-conductor conduit and the stinger assembly in a lowered position and decouples the multi-conductor conduit and the stinger assembly in a raised position. Element 8: wherein the electrical power manifold further includes an idler gear coupling an upper connection formed on an uphole end of the housing and a lower connection formed on a downhole end of the housing. Element 9: wherein the electrical power manifold further includes a kelly port in a housing of the electrical power manifold for coupling to a kelly hose. Element 10: wherein the stinger assembly further includes a cleaning system at an end of the stinger assembly where the stinger assembly couples to the multi-conductor conduit. Element 11: further comprising an idler gear coupling the upper connection and the lower connection. Element 12: further comprising actuating an actuator on the electrical power manifold to couple a stinger assembly in the electrical power manifold to the multi-conductor conduit. Element 13: further comprising pumping a drilling fluid into the wellbore. Element 14: wherein supplying power to the electrical power manifold includes changing the position of a switch to selectively supply power to the electrical power manifold or to a top drive coupled to the electrical power manifold. Element 15: wherein installing the drill string in the wellbore includes powering a top drive to rotate the drill string.

Although the present disclosure has been described with several embodiments, various changes and modifications may be suggested to one skilled in the art. It is intended that the present disclosure encompasses such various changes and modifications as falling within the scope of the appended claims.

What is claimed is:

1. An electrical conveyance system, comprising:
   an electrical power manifold;
   a drill string coupled to the electrical power manifold;
   a multi-conductor conduit extending through an interior of the drill string;
   a stinger assembly extending from an exterior of the electrical power manifold to an interior of the electrical power manifold to couple the multi-conductor conduit to an electrical power source, the stinger assembly including:
   a stationary cable;
   a rotating cable; and
   a slip ring coupling the stationary cable and the rotating cable; and
   a pulsed-power drill bit coupled to the drill string and the multi-conductor conduit.

2. The electrical conveyance system of claim 1, further comprising a top drive coupled to the electrical power manifold.

3. The electrical conveyance system of claim 2, wherein a lower connection of the top drive is coupled to an upper connection of the electrical power manifold.

4. The electrical conveyance system of claim 2, wherein an upper connection of the top drive is coupled to a lower connection of the electrical power manifold.

5. The electrical conveyance system of claim 1, wherein the multi-conductor conduit further includes a plurality of centralizing fins separating an outer wall of the multi-conductor conduit from an inner wall of the drill string to create an annulus between the outer wall of the multi-conductor conduit and the inner wall of the drill string.

6. The electrical conveyance system of claim 1, wherein the electrical power manifold further includes a seal positioned at an opening in a housing of the electrical power manifold.

7. The electrical conveyance system of claim 1, wherein the electrical power manifold further comprises:
   a connector coupling the multi-conductor conduit to the stinger assembly; and
   an actuator coupled to the stinger assembly to raise and lower the connector such that the connector couples the multi-conductor conduit and the stinger assembly in a lowered position and decouples the multi-conductor conduit and the stinger assembly in a raised position.

8. The electrical conveyance system of claim 1, wherein the electrical power manifold further includes an idler gear coupling an upper connection formed on an uphole end of the housing and a lower connection formed on a downhole end of the housing.

9. The electrical conveyance system of claim 1, wherein the electrical power manifold further includes a kelly port in a housing of the electrical power manifold for coupling to a kelly hose.

10. The electrical conveyance system of claim 1, wherein the stinger assembly further includes a cleaning system at an end of the stinger assembly where the stinger assembly couples to the multi-conductor conduit.

11. The electrical conveyance system of claim 1, wherein the multi-conductor conduit is arranged in a coaxial design.

12. An electrical power manifold, comprising:
    a housing;
    a chamber formed within the housing;
    an upper connection formed on an uphole end of the housing;
    a lower connection formed on a downhole end of the housing; and
    a stinger assembly extending from an exterior of the housing to an interior of the housing to couple with a multi-conductor conduit in a drill string, the multi-conductor conduit coupling a pulsed-power drill bit to an electrical power source, the stinger assembly including:
    a stationary cable;
    a rotating cable; and
    a slip ring coupling the stationary cable and the rotating cable.

13. The electrical power manifold of claim 12, further comprising a seal positioned at an opening in the housing.

14. The electrical power manifold of claim 12, further comprising:
    a connector coupling the multi-conductor conduit to the stinger assembly; and
    an actuator coupled to the stinger assembly to raise and lower the connector such that the connector couples the multi-conductor conduit and the stinger assembly in a lowered position and decouples the multi-conductor conduit and the stinger assembly in a raised position.

15. The electrical power manifold of claim 12, further comprising an idler gear coupling the upper connection and the lower connection.

16. The electrical power manifold of claim 12, further comprising a kelly port in the housing for coupling to a kelly hose.

17. The electrical power manifold of claim 12, wherein the stinger assembly further includes a cleaning system at an end of the stinger assembly where the stinger assembly couples to the multi-conductor conduit.

18. The electrical power manifold of claim 12, wherein a lower connection of a top drive is coupled to the upper connection.

19. The electrical power manifold of claim 12, where an upper connection of a top drive is coupled to the lower connection.

20. The electrical power manifold of claim 12, wherein the multi-conductor conduit is arranged in a coaxial design.

21. A method for conveying electrical power to a downhole tool, comprising:
- installing a drill string in a wellbore, the drill string containing a multi-conductor conduit extending through the interior of the drill string;
- coupling a downhole end of the drill string to a pulsed-power drill bit and an uphole end of the drill string to an electrical power manifold;
- changing the position of a switch to selectively supply power to the electrical power manifold or to a top drive coupled to the electrical power manifold;
- supplying power to the electrical power manifold; and
- performing a subterranean operation using the pulsed-power drill bit.

22. The method of claim 21, further comprising actuating an actuator on the electrical power manifold to couple a stinger assembly in the electrical power manifold to the multi-conductor conduit.

23. The method of claim 21, further comprising pumping a drilling fluid into the wellbore.

24. The method of claim 21, wherein installing the drill string in the wellbore includes powering the top drive to rotate the drill string.

\* \* \* \* \*